United States Patent [19]

Brisk

[11] Patent Number: 5,711,710
[45] Date of Patent: Jan. 27, 1998

[54] ROTATING SHAFT COUPLING GUARD

[76] Inventor: Kenneth J. Brisk, 3004 Guilford Ct., New Bern, N.C. 28562

[21] Appl. No.: 501,408

[22] Filed: Jul. 12, 1995

[51] Int. Cl.$^6$ .................................................. F16C 1/26
[52] U.S. Cl. ........................................ 464/170; 74/609
[58] Field of Search ............................. 464/170, 176; 74/608, 609; 52/DIG. 14, 86; 220/252, 327, 328

[56] References Cited

U.S. PATENT DOCUMENTS

| | | | |
|---|---|---|---|
| 926,800 | 7/1909 | Young | 74/609 |
| 2,424,340 | 7/1947 | Sterrett | 220/252 X |
| 2,443,035 | 6/1948 | Hardy | 464/176 |
| 2,491,957 | 12/1949 | Dilley | 74/608 |
| 2,512,528 | 6/1950 | Holman | 74/609 |
| 2,612,763 | 10/1952 | Hansen | 464/176 |
| 2,775,905 | 1/1957 | Jackson | 74/609 |
| 3,521,495 | 7/1970 | Schildmeier | 74/609 |
| 3,626,767 | 12/1971 | Wildi | 464/176 X |
| 3,824,890 | 7/1974 | Zettler et al. | 74/608 X |
| 4,040,336 | 8/1977 | Lewis et al. | 74/608 |
| 4,218,853 | 8/1980 | Willoughby | 74/609 |
| 4,779,484 | 10/1988 | Poe | 74/608 |

FOREIGN PATENT DOCUMENTS

| | | | |
|---|---|---|---|
| 2639982 | 6/1990 | France | 52/86 |

*Primary Examiner*—Lenard A. Footland
*Assistant Examiner*—Eileen A. Dunn
*Attorney, Agent, or Firm*—Rhodes, Coats & Bennett, L.L.P.

[57] ABSTRACT

A guard for shielding a rotating coupling interconnecting two rotating driveshafts. The coupling guard includes an arched cover sleeve formed from a flexible, planar sheet of material, preferably plastic, secured with a pair of brackets to a frame structure adjacent the rotating shaft coupling. The cover sleeve defines two opposed end openings, through which the rotating shafts extend, on opposite sides of the rotating shaft coupling. Preferably, the sheet of material forming the sleeve is scored with longitudinally running grooves, which enhance the flexibility of the sheet. Also, the coupling guard preferably includes a pair of arcuate end caps that cover the end openings and have central voids to permit the driveshafts to extend therethrough.

18 Claims, 4 Drawing Sheets

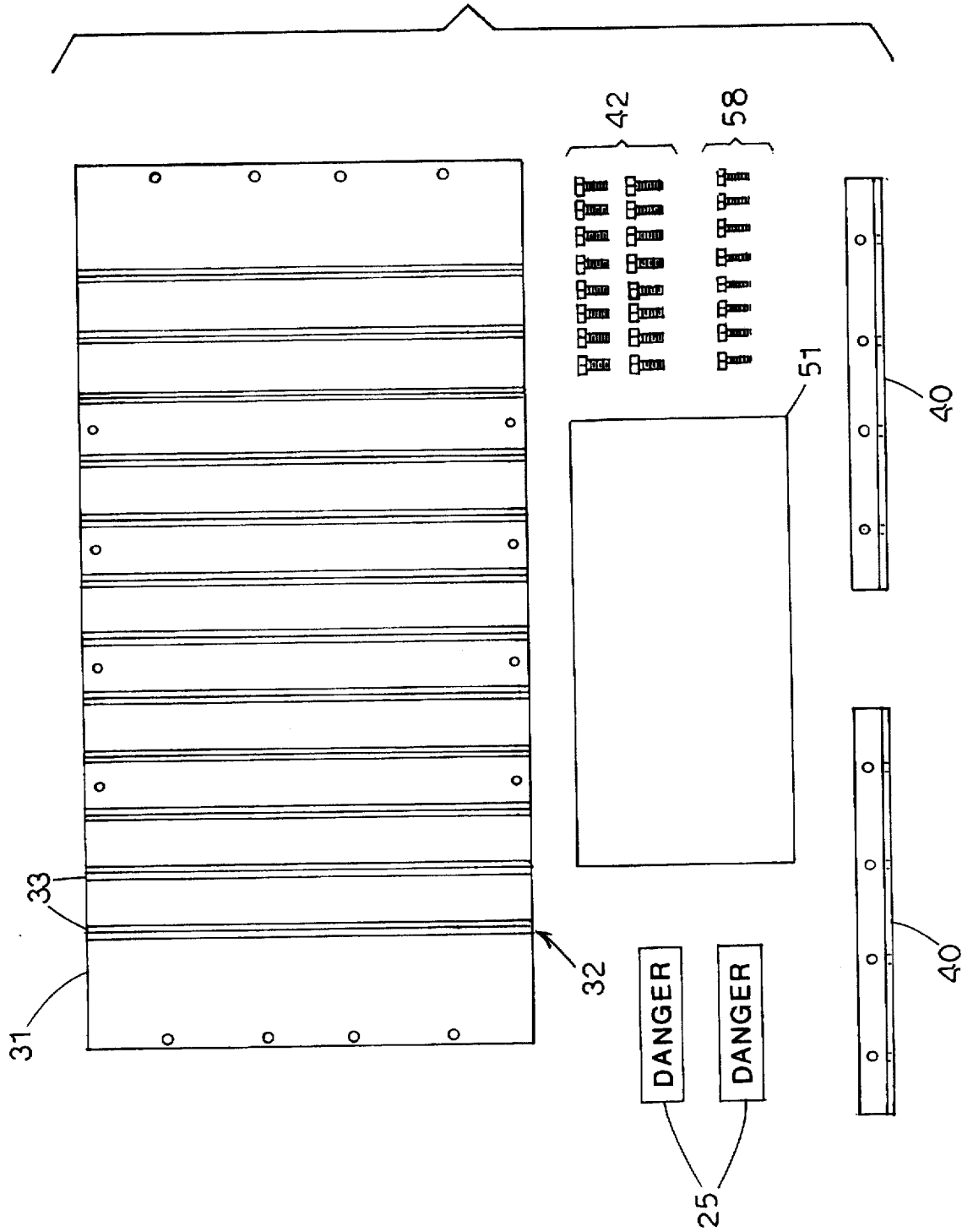

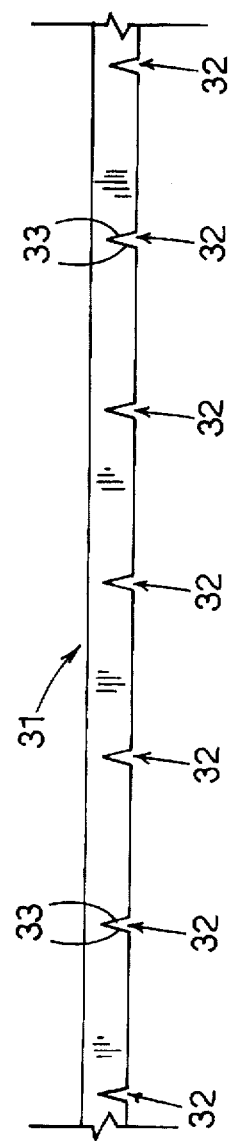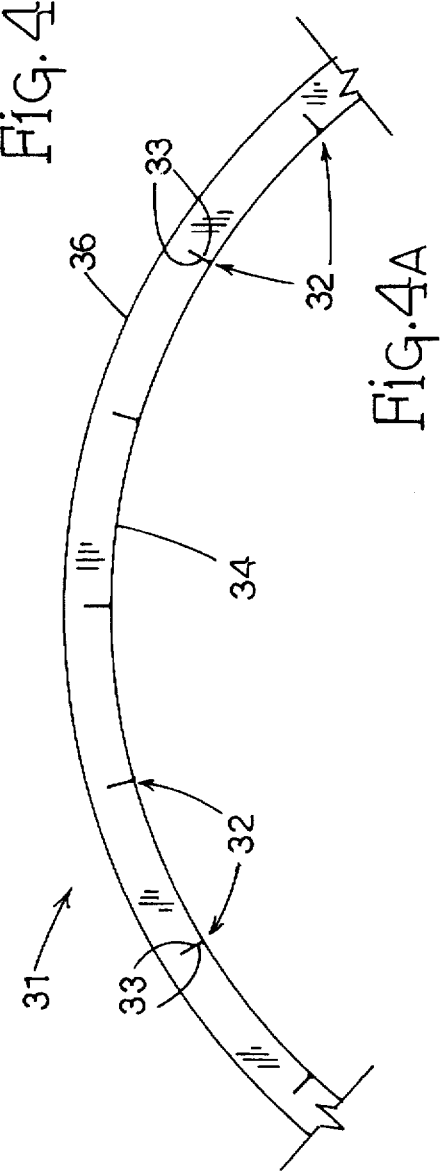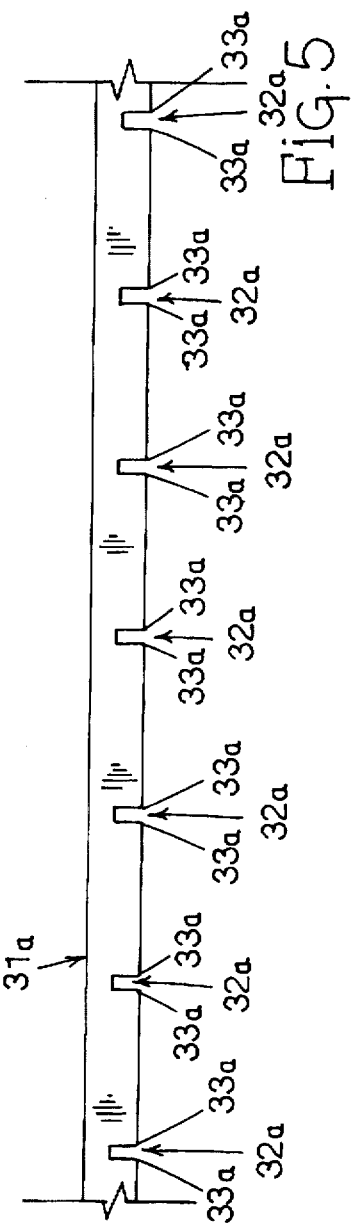

ROTATING SHAFT COUPLING GUARD

FIELD OF THE INVENTION

The present invention generally relates to a guard for shielding a coupling joint interconnecting two rotating shafts, and more particularly relates to an arched cover sleeve formed from a planar, grooved sheet of flexible high impact material, which is fitted with a pair of arcuate end caps, for preventing objects from coming in contact with a coupling between two rotating driveshafts.

BACKGROUND OF THE INVENTION

As is well known to those in industrial environments, government regulations, such as OSHA requirements, strictly mandate the use of safety guards around rotating pieces of equipment to protect individuals working nearby. Such guards prevent individuals from accidentally touching the rotating equipment and prevent loose clothing, such as ties or sleeves, from becoming tangled in the equipment, all of which can cause serious injury.

A common example of rotating equipment involves a drive-train structure that includes a power source, such as an electric or gas motor, coupled via interconnected driveshafts to a driven piece of equipment, such as a pump or power transmission. Typically, with these types of apparatuses, the driveshaft leading from the power source and the driveshaft leading into the driven piece of equipment are both exposed so that they can be easily joined together by some type of mechanical coupling joint.

In order to comply with applicable safety regulations, the installer or user of such equipment must provide a guard for shielding the rotating driveshafts and coupling. Presently, these types of guards must be custom fabricated by skilled craftspersons to fit the particular dimensions and requirements of each application. Typically, such guards are fabricated from carbon steel materials, which require a high degree of skill to work with and are, by nature, labor intensive, requiring many hours of work and much associated expense.

There are several problems inherent with such conventional rotating coupling guards. Because of the relatively high expense associated with these custom-made guards, maintenance after initial fabrication and installation is oftentimes neglected. Maintenance is essential with these guards because carbon steel is susceptible to rust and corrosion, which may lead to a false sense of security for individuals working around the particular equipment. However, the high expenses of maintenance tend to preclude its regular performance in addition to simply placing an unwanted financial burden on a company using the equipment.

Accordingly, there exists a need for a new and improved rotating coupling guard that can be easily and cheaply fabricated, installed, and maintained by relatively unskilled workers, while at the same time providing adequate protection for nearby workers so as to comply with all applicable industrial safety regulations.

SUMMARY AND OBJECTS OF THE INVENTION

The present invention is directed to a guard for shielding a rotating coupling interconnecting two rotating driveshafts. In a preferred embodiment of the invention, the coupling guard includes an arched, U-shaped cover sleeve formed from a flexible sheet of high density, high impact plastic adapted to enclose the rotating shaft coupling, thereby shielding the coupling so as to prevent objects such as fingers from contacting the coupling. The cover sleeve is spaced apart from the coupling so as not to interfere with rotation of the shafts and the coupling. The cover sleeve is secured with a pair of angle-iron brackets to a frame structure adjacent the rotating shaft coupling and stationary relative to the rotating shaft coupling. The cover sleeve defines two opposed end openings, through which the rotating shafts extend, on opposite sides of the rotating shaft coupling.

Also in a preferred embodiment of the invention, the sheet of material forming the arched cover sleeve is scored with a plurality of longitudinally running, incrementally spaced grooves that enhance flexibility of the sheet. When the sheet of material is bent into the arched sleeve, the grooves run parallel to the driveshafts on the sleeve's inner surface. Preferably, the grooves are dimensioned so that upon bending the sleeve to a certain degree, edges of the grooves meet and provide rigidity to the sleeve.

Also in a preferred embodiment of the invention, the coupling guard includes a pair of arcuate end caps for partially covering the end openings. The arcuate end caps have generally semi-circular outer edges that conform to the inner surface of the cover sleeve, and generally semi-circular inner edges around central voids that are cut out to permit the driveshafts to extend therethrough. The arcuate end caps are each secured to the inner surface of the cover sleeve adjacent respective end openings with a plurality of lag bolts or other fasteners extending through holes in the cover sleeve and into holes bored into the outer edges of the end caps. Preferably, the arcuate end caps are formed from a planar sheet of high density, high impact plastic that is thicker than the sheet of plastic forming the cover sleeve.

In view of the above, an object of the invention is to provide an easily and inexpensively fabricated, installed, and maintained guard for a rotating driveshaft coupling that provides protection for workers and other individuals in close proximity to the rotating driveshaft coupling.

Another object of the present invention is to provide a universal kit for custom-fabricating a rotating shaft coupling guard, which can be adapted to shield a wide variety of drive train structures that utilize shaft couplings.

Another object of the present invention is to provide a shielded rotating driveshaft coupling, comprising: a drive-train structure mounted to an adjacent base frame, the drive-train structure including i) a first rotating driveshaft driven by a power source, ii) a second rotating driveshaft, and iii) a shaft coupling interconnected between the first and second driveshafts for transferring rotational force from the first driveshaft to the second driveshaft; and a shaft coupling guard for shielding the shaft coupling so as to prevent objects such as fingers from coming in contact with the shaft coupling without interfering with rotation of the driveshafts and the shaft coupling, the shaft coupling guard including i) an arched cover sleeve running longitudinally generally parallel to the driveshafts and formed from a sheet of flexible material adapted to enclose the shaft coupling, wherein the cover sleeve is scored with a plurality of incrementally spaced, longitudinally running grooves on a surface thereof to allow for increased flexibility of the cover sleeve ii) a bracket structure for fastening the cover sleeve to the base frame, iii) the cover sleeve defining two opposed end openings through which the rotating shafts extend, and iv) a pair of end caps having arcuate outer edges generally conforming to the end openings and attached to the cover sleeve adjacent the end openings, wherein each end cap defines a central void through which one of the driveshafts extends, and wherein the end caps are each secured to an inner surface of the cover sleeve adjacent respective end openings with a plurality of fasteners that extend through holes in the cover sleeve and into holes bored into the arcuate outer edges of the end caps.

Another object of the present invention is to provide a method for shielding a rotating shaft coupling interconnected between two rotating shafts, comprising the steps of: measuring an arc around the shaft coupling and exterior to an outermost point of travel of the rotating shaft coupling; measuring a distance from one end of the rotating shaft coupling to an opposite end of the rotating shaft coupling; cutting a flexible, planar sheet of high density, high impact material according to these measurements; fastening, with a first bracket, a first edge of the sheet of material to a base frame that is adjacent and immobile relative to the rotating shaft coupling; bending the sheet of material into an arched, longitudinally running sleeve that covers the rotating shaft coupling and lies in the measured arc; fastening a second edge of the sheet of material, opposite the first edge, to the base frame with a second bracket; scoring one surface of the sheet of material with a plurality of longitudinally running grooves before bending the material into the arched sleeve; placing a second planar sheet of material against an end opening of the arched sleeve and inscribing a cut line on the second sheet of material; cuffing a first arcuate end cap from the second sheet of material according to the inscribed cut line; cutting from the first arcuate end cap a void sized and shaped to permit one of the rotating shafts to extend therethrough; cutting a second arcuate end cap using the first arcuate end cap as a template; and securing the arcuate end caps to opposite ends of the arched sleeve so as to fill in space between the rotating shafts and inner walls of the arched sleeve.

Other objects and advantages of the present invention will become apparent and obvious from a study of the following description and the accompanying drawings, which are merely illustrative of such invention.

BRIEF DESCRIPTION OF THE DRAWINGS

FIG. 3 shows a kit of components for fabricating a coupling guard according to the invention.

FIG. 4 is an end view of the grooved sheet of material that forms the arched cover sleeve of the invention, shown in this embodiment with V-shaped grooves.

FIG. 4A is the grooved sheet of material of FIG. 4A shown flexed into an arch.

FIG. 5 is an end view of an alternate embodiment of the grooved sheet of material, shown here with square-cut grooves.

DETAILED DESCRIPTION OF THE INVENTION

Figure 1:
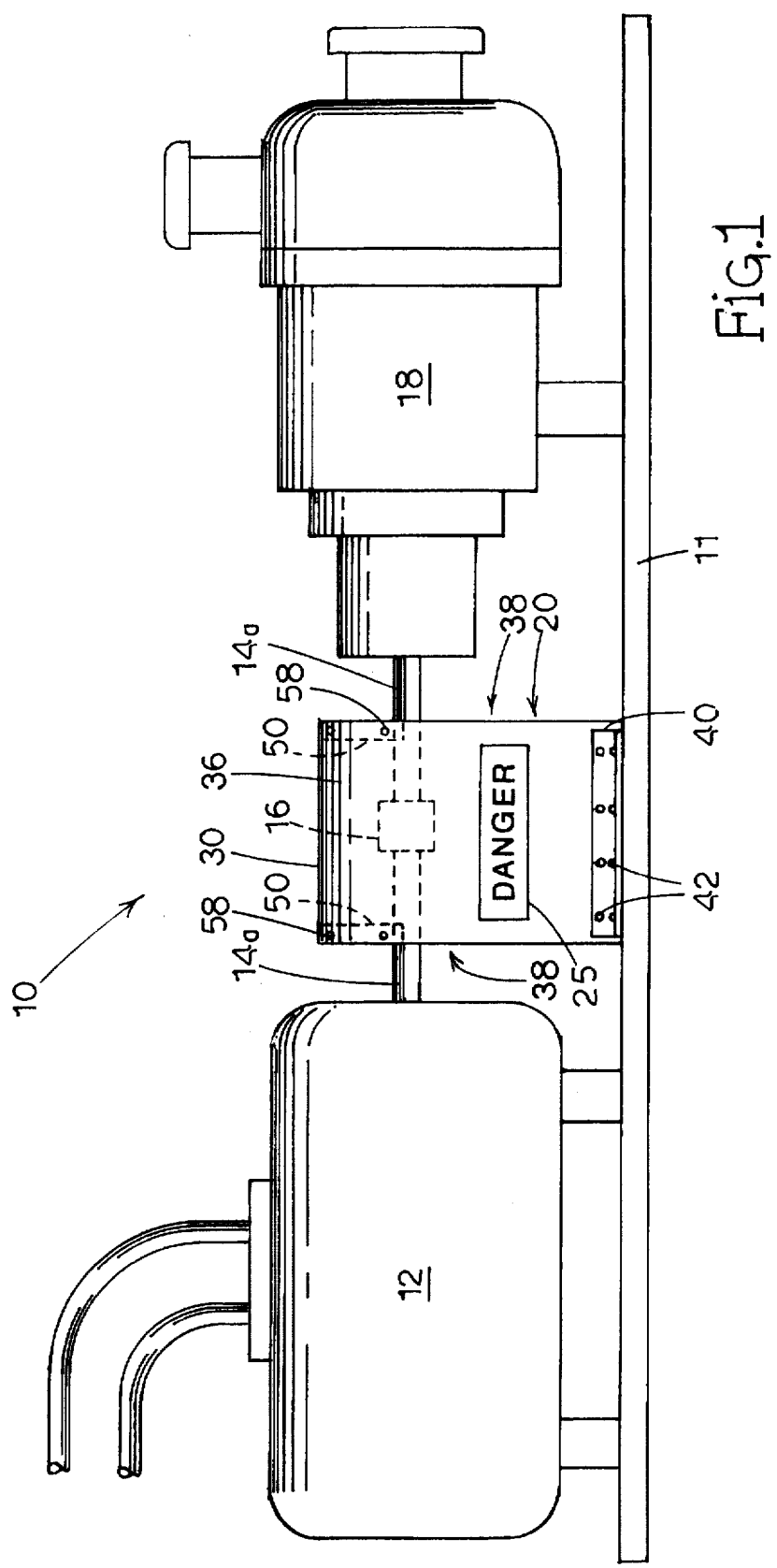
FIG. 1 is a side view of a typical drive-train structure having a rotating driveshaft coupling that is shielded by the coupling guard of the invention.

Referring now to the drawings, it should be understood that the illustrations are for the purpose of describing a preferred embodiment of the invention are not intended to limit the invention thereto. As best seen in FIG. 1, a coupling guard, generally designated with the numeral 20, is shown constructed according to the present invention and shielding components of a typical drive-train structure 10. The drive-train structure 10 is shown mounted on a stable base frame structure 11, which supports the components of the drive-train structure 10 thereon. In this example, the drive-train structure 10 includes a rotational power source 12, such as a gas or electric motor, which drives any conventional piece of driven equipment 18, such as a pump, a power transmission, a turbine, etc. The power source 12 outputs rotational power through a first driveshaft 14a, and the driven equipment receives power through a second driveshaft 14b. The driveshafts 14a,b are connected together, end to end, by any conventional driveshaft coupling joint 16, such as a universal joint, a spline and socket, intermeshing gears, a sleeve-type coupling, or any other shaft coupling joint that transfers rotational force from one rotating shaft to another. As should be appreciated, such exposed rotating equipment is generally dangerous and in industrial settings is usually required to be shielded in some way to prevent objects and workers' limbs from touching the rotating machinery.

The coupling guard 20 of the present invention is shown covering the rotating portions of the drive train structure 10 so as to shield the shaft coupling joint 16 and portions of the driveshafts 14a,b on opposite ends of the coupling joint 16. As shown in this embodiment, the coupling guard 20 is embellished with one or more optional DANGER stickers 25 on its outer surface to comply with any applicable safety regulations and to give a clear warning to those working near the drive-train structure 10. Likewise, the coupling guard 20 is preferably colored with a bright warning color such as yellow, red, or orange. The coupling guard 20 is shown fastened to the base frame 11 by brackets 40 and fasteners 42, such as nuts and bolts, screws, rivets, glue, etc. so that the coupling guard 20 remains stationary relative to the rotating coupling joint 16. As should be appreciated, the coupling guard 20 provides adequate clearance for the coupling joint 16 and driveshafts 14a,b to rotate without any interference or contact with the coupling guard 20, yet cover enough of the rotating equipment to ensure that objects, such as fingers, cannot easily be inserted into the equipment.

Figure 2:
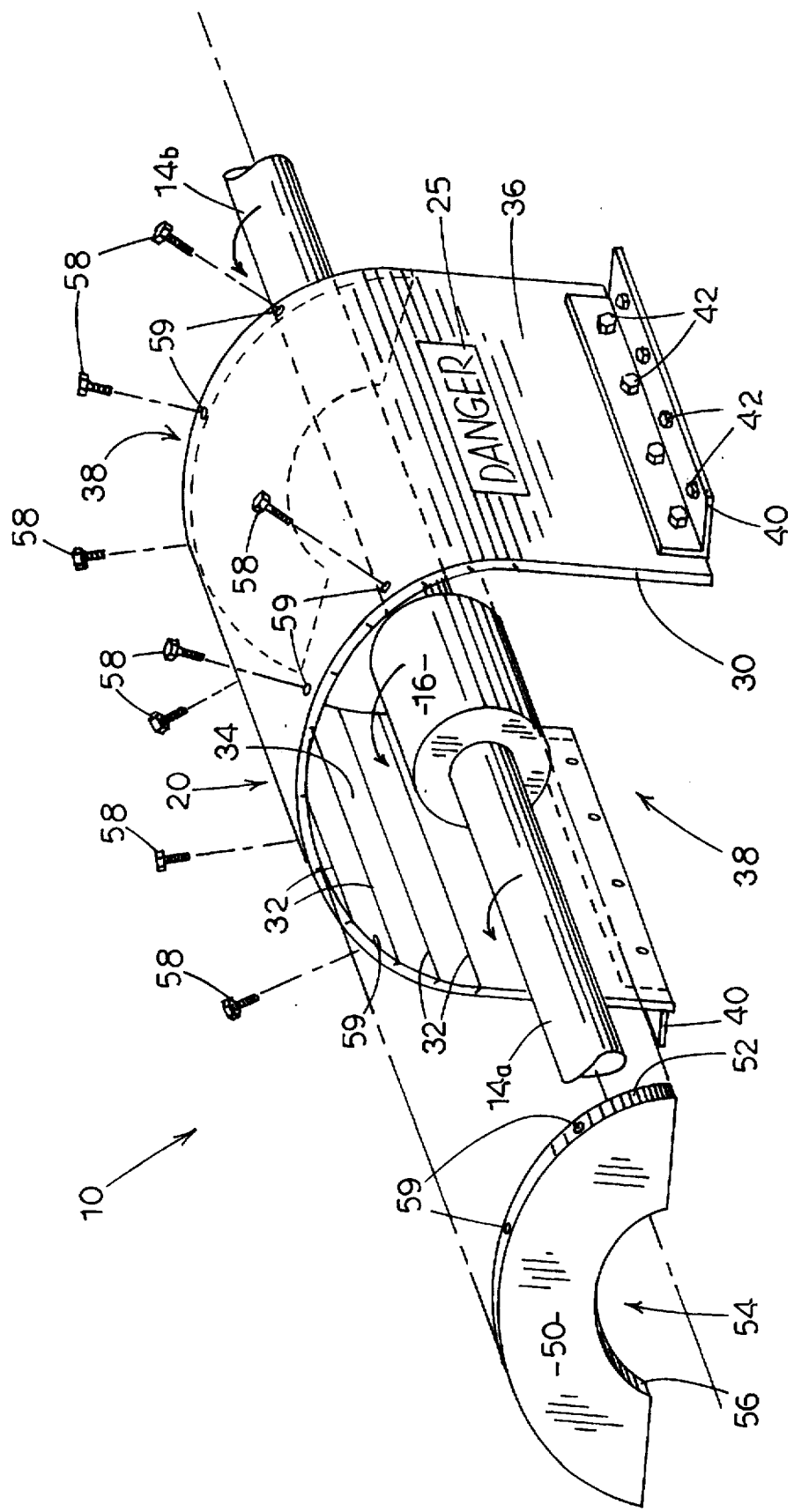
FIG. 2 is a partially exploded perspective view of the coupling guard of the invention.

Turning now to the partially exploded perspective view of the coupling guard 20 shown in FIG. 2, it can more clearly be seen that the coupling guard 20 preferably forms an arched, U-shaped shield overtop of the coupling joint 16 when fastened down to the base frame 11. However, the coupling guard 20 could also take on other shapes depending on how and where it is fastened to the frame 11. For example, the coupling guard 20 could form a nearly round tube (not shown) if the base frame 11 was shaped like a vertical fin and the brackets 40 were fastened to opposite sides of this fin-shaped base frame. In any case, the coupling guard 20 preferably runs in a longitudinal direction generally parallel with the driveshafts 14a,b. It is envisioned, however, that the coupling guard 20 could also be used to shield an angled coupling joint 16, such as would be the case with driveshafts 14a,b meeting at an angle and connected together with a universal joint.

The coupling guard 20 includes a cover sleeve 30 that is formed from a sheet of high density, high impact material that is sturdy enough to meet applicable safety regulations, yet flexible enough to be bent over the coupling joint 16 without cracking or creasing. Preferably, the cover sleeve 30 is formed from a relatively thin sheet of a high molecular plastic compound, which avoids the problems inherent with sheet metal. However, it is envisioned that the coupling guard of the invention 20 could be made of corrosion resistant metal if necessary. To achieve the U-shape shown and to provide adequate shielding in typical applications, the cover sleeve 30 is formed from a generally planar, quadrangular sheet of plastic having a generally uniform thickness of, for example, ¼ inches. However, the cover sleeve 30 could be thinner or thicker depending on the intended application of the coupling guard 20.

The brackets 40 are preferably formed of angle-iron having a generally L-shaped cross-section. For example, each leg of the brackets 40 could be approximately ½ to 2½ inches wide and could be set at a 90 degree angle to one another. These dimensions could, of course, be different depending on the application of the coupling guard 20 and the size and shape of the base frame 11 to which the brackets 40 are fastened. The brackets 40 are fastened to opposite edges of the cover sleeve 30 with any conventional corrosion resistant fasteners 42 and are similar fastened to the base frame 11 with any appropriate corrosion resistant fasteners 42. It is also envisioned that the brackets 40 could be made of plastic; however, corrosion resistant steel is preferable.

One advantage of using plastic instead of metal for the cover sleeve 30 is that the coupling guard 20 is much more easily fabricated using plastic, because plastic is much more easily cut and shaped than metal. In the preferred form of the invention, the coupling guard 20 could be supplied to industrial users in a universal kit form, shown in FIG. 3, which would include an uncut, planar sheet of plastic material 31 large enough to be used for almost any shielding application, the brackets 40, and other parts to be described later. For example, the sheet of plastic material 31 could be supplied in the kit as a planar 1 foot×4 feet sheet of ¼ inch plastic. Smaller or larger sheets 31 could just as easily be used, the idea being to supply a sheet large enough for most common shielding applications. A relatively unskilled worker could then cut the plastic sheet 31 according to whatever size cover sleeve 30 was needed for a particular shielding application without having to use complicated metal fabricating techniques.

In the preferred embodiment, the sheet of plastic material 31 forming the cover sleeve 30 is scored on one or both surfaces with a plurality of longitudinally running grooves 32 that are incrementally spaced from each other. These grooves 32 enhance the flexibility of the cover sleeve 30 and ensure that the U-shaped sleeve 30 has a uniform contour, without cracks or creases. As shown in the end view of FIG. 4A, the grooves 32 are preferably V-shaped and pre-cut on only one surface of the sheet of plastic material 31 before it is sized and cut for a particular coupling guard 20. However, the material 31 could also be scored on both surfaces with grooves 32 if desired. Preferably, when the sheet of material 31 is bent into the cover sleeve 30, the grooves 32 are on the inner surface 34 of the sleeve 30. This leaves a smooth outer surface 36 on which to affix the DANGER sticker(s) 25 and allows for easier cleaning of the coupling guard 20. Additionally, as shown in FIG. 4B, by scoring only the inner, concave surface 34, the side edges 33 of each groove 32 tend to meet when the material 31 is bent to a certain degree, limiting the amount of flexibility beyond a certain point and adding rigidity to the cover sleeve 30 once it is formed.

As should be appreciated, the degree of flexibility of the sheet material 31 can be increased by either spacing the grooves 32 closer together or by cutting the grooves 32 larger (deeper and/or wider). In a typical example of the invention, using approximately a ¼ inch thick plastic sheet 31, the grooves 32 could be cut approximately 1/16 inches wide at the top of the "V"×⅛ inches deep and could be spaced approximately 1 inch apart. However, these parameters could easily be varied depending on the application with which the coupling guard is used. For example, to form a coupling guard 20 with a relatively small diameter, the grooves 32 could be spaced only about ¼ to ½ inches apart. Conversely, with a coupling guard having a relatively wide diameter, the grooves 32 could be spaced about 2 inches apart.

FIG. 5 shows an alternated embodiment of the sheet 31a with the grooves 32a cut square-shaped, instead of V-shaped. In this example, the grooves 32a are shown cut ⅛ inch deep and 1/16 inch wide at their top and bottom. However, just as with V-shaped grooves 32, these dimensions could easily be altered. With this design, the top corners of the grooves 33a would meet to limit flexibility upon bending of the sheet into the cover sleeve 30. Other conceivable modifications include cutting smoothly rounded grooves. Alternately, the grooves 32 could be omitted altogether, such as if the plastic sheet were composed of thinner or more flexible material.

As is shown in FIGS. 1 and 2, the cover sleeve 30, along with the base frame 11, substantially surrounds the coupling joint 16 and the attached portions of the driveshafts 14a,b. The driveshafts 14a,b extend from within the coupling guard 20 through opposite end openings 38 defined by the cover sleeve 30 and the underlying base frame 11. If desired, one or both of these end openings 38 may be left open, as is, without any additional covering or shielding. However, in a preferred embodiment of the invention, both of the end openings 38 are partially covered with arcuate end caps 50 to enhance the safety and protection that the coupling guard 20 provides. For clarity, FIG. 2 shows only one end cap 50.

The arcuate end caps 50 preferably have semi-circular outer edges 52, which conform to the inner dimensions of the cover sleeve 30. The arcuate end caps 50 may be fastened to the ends of the cover sleeve 30 in many different manners adjacent the end openings 38. However, the preferred manner of fastening the end caps 50 to the cover sleeve 30 is to position the end caps 50 just inside the end openings 38 so that the outer edge 52 of each end cap 50 contacts the concave inner surface 34 of the sleeve 30. Then lag bolts 58 are inserted into holes 59, 59' bored through the sleeve 30 and into the outer edges 52 of the end caps 50. Central voids 54 are cut out of the end caps 50 to provide adequate clearance for the driveshafts 14a,b to extend therethrough. The central voids 54 are defined by semi-circular inner edges 56 of the end caps, which generally conform to the outer dimensions of the rotating driveshafts 14a,b. If desired, lower, secondary end caps (not shown) may also be used in conjunction with end caps 50 to completely cover the end openings 38 of the sleeve 30 below the driveshafts 14a,b.

As mentioned earlier and shown in FIG. 3, the present invention is preferably supplied in a universally adaptable kit from which a coupling guard 20 can easily be custom-made to fit around almost any drive train structure shaft coupling 16. In this kit, the end caps may be cut from the same sheet of material 31 that is used to form the cover sleeve 30. However, the end caps 50 are preferably cut from a separate sheet of material 51 that is slightly thicker than the sheet 31 used to form the sleeve 30. The end cap material 51 is thicker so that the lag bolts 58 can gain sufficient purchase in the end caps 50 and so that the holes 59, 59' in the end caps 50 are not accidentally bored through the end caps' planar surfaces. Preferably, the end caps 50 are formed from the same high density, high impact plastic as the sleeve 30, only thicker. Preferably, the end caps are approximately ⅜ inch thick although they could be thinner or thicker, depending on the application of the invention. Because the end caps 50 remain planar and are not bent, there is no need to score the end cap material 51 with grooves 32, although if the sleeve material 31 is also used to fabricate the end caps 50, the grooves 32 may be present in the end caps 50. In the kit shown in FIG. 3, the second sheet of plastic 51 could be supplied as, for example, a planar 1 foot×2 feet sheet of ⅜ inch plastic.

To easily custom-fabricate and assemble the coupling guard 20 of the invention, a worker should perform the following steps. To determine the size of the coupling guard 20 required, the first step is to measure the length of an arc around the shaft coupling 16 exterior to its outermost point of travel during rotation. The next step is to measure the distance from one end of the rotating shaft coupling 16 to the opposite end of the rotating shaft coupling 16 to determine the desired length of the coupling guard 20. The cover sleeve 30 is then cut from the sheet of cover sleeve material 31 according to these measurements. If the brackets 40 supplied in the kit are longer than the cover sleeve 30, they too may be cut so they do not protrude past the ends of the cover sleeve 30.

Next, one edge of the cover sleeve 30 is fastened with a first bracket 40 and fasteners 42 to the base frame 11 adjacent to the rotating shaft coupling 16. The sheet of material forming the cover sleeve 30 is then bent around the shaft coupling 16 into a U-shaped, longitudinally running sleeve 30 lying in the arc measured in the first step. The free, second edge of the sleeve 30 is then fastened to the base frame 11 with a second bracket 40 and fasteners 42 to form the coupling guard 20.

As described earlier, the sleeve 30 is preferable formed from a sheet of material 31 that has been scored with grooves 32. Therefore, if grooves 32 are desired, the sheet of material 31 is scored with a plurality of incrementally spaced grooves 32 before the sheet of material 31 is cut and bent into the sleeve 30. Then, care should be taken when the sleeve 30 is cut that the grooves 32 run longitudinally, generally parallel with the driveshafts 14a,b. When the cut material 31 is bent into the sleeve 30, the grooves 32 are preferably located on the inner surface 34 of the sleeve 30.

Lastly, in the preferred method of the invention, end caps 50 are formed and installed on the coupling guard 20. The end caps 50 can be formed in several ways. A preferred method is as follows: First, either the remainder of the sheet of material 31 or, preferably, the second, thicker planar sheet of material 51 is placed against one of the end openings 38 of the cover sleeve 30. A cut line is inscribed on the sheet of material 51 according to the dimensions of the end opening 38. Next, a first arcuate end cap 50 is cut from the sheet of material 51 according to the inscribed cut line with, for example, a saber saw. A central void 54 is cut from the first arcuate end cap 50 according to the outer dimensions of the driveshafts 14a,b to allow the respective driveshaft to extend unencumbered through the void 54 and rotate without contacting the end cap 50, which ultimately resembles one-half of a donut. A second arcuate end cap 50 is cut from the same sheet of material 51 using the first arcuate end cap 50 as a template.

An alternate method of fabricating the end caps 50 is to cut the end caps 50 from the sheet of material 51 according to a template (not shown) supplied in the coupling guard 20 kit. Preferably, with this method, a variety of templates would be included in the kit or the template could be adaptable in order to encompass many different sizes and shaped of desired coupling guards.

After fabrication, the arcuate end caps 50 are positioned in opposite end openings 38 of the sleeve 30 so as to partially fill in the space between the rotating driveshafts 14a,b and inner walls 34 of the sleeve 30. Mounting holes 59 are bored in the outer surface 36 of the cover sleeve 30 and into the end caps 50 through the arcuate outer edges 52 thereof to form screw holes 59'. Lag bolts 58 or other suitable fasteners, such as wood screws, are then inserted into the holes 59,59' to secure the end caps 50 in place. Alternately, the end caps 50 could be glued or ultrasonically welded into place adjacent the end openings of the sleeve 30.

The coupling guard of the invention 20 is easy to fabricate, install, and maintain. As should be appreciated, no special skills are needed to shield a rotating shaft coupling using the coupling guard 20 and method of the invention. Therefore, the coupling guard 20 of the invention saves a company money in terms of both material costs and labor costs, not to mention the money saved by providing a safer working environment.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A guard for shielding a pair of exposed rotating shafts and an interconnecting coupling that connects the two shafts comprising:
   a) means for longitudinally shielding the two exposed rotating shafts and the interconnecting coupling connecting the shafts;
   b) the longitudinally shielding means including a main inverted generally U-shaped panel that extends and curves over the two exposed rotating shafts and the interconnecting coupling;
   c) the main inverted U-shaped panel including a pair of opposed open ends;
   d) means for transversely shielding the two exposed rotating shafts and the interconnecting coupling;
   e) the transversely shielding means including a pair of end panels secured to the main panel and extending transversely across the open ends of the main panel; and
   f) a shaft cut-out formed in each end panel for allowing a rotating shaft to pass therethrough.

2. The guard for shielding a pair of exposed rotating shafts and an interconnecting coupling of claim 1 wherein the U-shaped panel includes an open bottom.

3. The guard for shielding a pair of exposed rotating shafts and an interconnecting coupling of claim 2 wherein the main shield panel is constructed of a high density, high impact plastic.

4. The guard for shielding a pair of exposed rotating shafts and an interconnecting coupling of claim 3 wherein the main shield panel is scored on a surface thereof with a plurality of longitudinally running, incrementally spaced grooves.

5. The guard for shielding a pair of exposed rotating shafts and an interconnecting coupling of claim 4 wherein the main shield panel has a thickness of approximately ¼ to ⅜ inch.

6. The guard of claim 1 wherein the main shield panel is of generally uniform thickness.

7. The guard of claim 6 wherein the main shield panel is composed of approximately ¼ inch thick high density, high impact plastic.

8. The guard of claim 1 wherein the main shield panel is scored on a surface with a plurality of longitudinally running, incrementally spaced grooves.

9. The guard of claim 1 wherein said end panels have generally semi-circular outer edges that conform to an inner, concave surface of the main shield panel.

10. The guard of claim 1 wherein said main shield panel further includes a plurality of end panel mounting holes and wherein said end panels further include a plurality of screw holes on the outer edges thereof, and wherein said end panels are secured to the main shield panel with a plurality of fasteners extending through said mounting holes and into said screw holes.

11. The guard of claim 10 wherein said end panels are formed from a material that is thicker than said main shield panel.

12. The guard of claim 11 wherein said end panels are formed from approximately ⅜ inch thick high density, high impact plastic.

13. The guard of claim 1 wherein said main shield panel is formed from a single flexible sheet of a high density, high impact material.

14. The guard of claim 13 wherein said main shield panel is formed from a generally planar, quadrangular sheet of material.

15. A machine assembly including a guard for shielding a pair of exposed rotating shafts and a coupling interconnecting the shafts, comprising:

a) a pair of exposed rotating shafts and a coupling interconnecting the pair of rotating shafts;

b) a generally inverted U-shaped main guard panel for extending and curving over the pair of exposed rotating shafts and the coupling interconnecting the shafts;

c) the main guard panel including a pair of opposed open ends and an open throughway defined internally within the main guard panel for permitting the two exposed rotating shafts and the interconnecting coupling to pass internally through the guard without the two shafts and the interconnecting coupling touching the main guard panel;

d) a pair of end panels secured over the respective open ends of the main guard panel; and e) shaft cut-outs formed in the end panels for permitting the rotating shafts being shielded to extend therethrough.

16. The guard for shielding the two rotating shafts and the interconnecting coupling of claim 15 wherein the main guard panel comprises a high density, high impact plastic.

17. The guard for shielding the two rotating shafts and interconnecting coupling of claim 16 wherein the high density, high impact plastic main guard panel is of a thickness of approximately ¼ to ⅜ inch.

18. The guard for shielding the two rotating shafts and the interconnecting coupling of claim 15 wherein the main guard panels includes a series of longitudinally extending, incrementally spaced scoring grooves formed about a surface thereof for enabling the shield to be curved to form its shape.

* * * * *